United States Patent
Nagamatsu et al.

(10) Patent No.: US 6,217,774 B1
(45) Date of Patent: Apr. 17, 2001

(54) SIMULATED MOVING BED SEPARATION APPARATUS

(75) Inventors: Shinji Nagamatsu, Niigata-ken; Koichi Murazumi, Hyogo-ken, both of (JP)

(73) Assignee: Daicel Chemical Industries, Ltd., Osaka-fu (JP)

( * ) Notice: Subject to any disclaimer, the term of this patent is extended or adjusted under 35 U.S.C. 154(b) by 0 days.

(21) Appl. No.: 09/476,354

(22) Filed: Jan. 3, 2000

Related U.S. Application Data (62) Division of application No. 09/077,541, filed as application No. PCT/JP96/03500 on Nov. 29, 1996, now abandoned.

(30) Foreign Application Priority Data

Jan. 12, 1995 (JP) .................................................. 7-314364
Dec. 12, 1995 (JP) .................................................. 7-323377

(51) Int. Cl.[7] ................................................ B01D 15/08
(52) U.S. Cl. ...................................... 210/659; 210/198.2
(58) Field of Search ........................... 210/635, 656, 210/659, 199.2

(56) References Cited

U.S. PATENT DOCUMENTS

| | | | |
|---|---|---|---|
| 4,182,633 | 1/1980 | Ishikawa et al. | 210/198.2 |
| 4,267,054 | 5/1981 | Yoritomi et al. | 210/659 |
| 4,379,751 | 4/1983 | Yoritomi et al. | 210/659 |
| 4,478,721 | 10/1984 | Gerhold | 210/659 |
| 4,498,991 | 2/1985 | Oroskar | 210/659 |
| 4,970,002 | 11/1990 | Ando et al. | 210/198.2 |
| 5,457,260 | 10/1995 | Holt | 585/820 |
| 5,470,482 | 11/1995 | Holt | 210/662 |
| 5,556,546 | 9/1996 | Tanimura et al. | 210/198.2 |

FOREIGN PATENT DOCUMENTS

| | | | |
|---|---|---|---|
| 2756496 | 6/1978 | (DE) | 210/198.2 |
| 0495640 | 7/1992 | (EP) | 210/198.2 |
| 4131104 | 5/1992 | (JP) | 210/198.2 |
| 7323203 | 12/1995 | (JP) | 210/198.2 |
| 7328305 | 12/1995 | (JP) | 210/198.2 |
| 9216274 | 10/1992 | (WO) | 210/198.2 |

*Primary Examiner*—Ernest G. Therkorn
(74) *Attorney, Agent, or Firm*—Birch, Stewart, Kolasch & Birch, LLP (57) ABSTRACT

This invention is intended to provide a simulated moving bed separation apparatus which is able to monitor concentration distribution of components in the fluid circulation passage or a simulated moving bed separation apparatus which is able to automatically control the operation conditions to optimum and provides a simulated moving bed apparatus provided with concentration detectors installed in the fluid circulation passage and means for measuring concentrations installed at outlets of the fluid circulation passage.

6 Claims, 6 Drawing Sheets

SIMULATED MOVING BED SEPARATION APPARATUS

This application is a division of Ser. No. 09/077,541, filed Aug. 3, 1998, now abandoned, which, in turn, claims the benefit under 35 U.S.C. §371 of prior PCT International Application No. PCT/JP96/03500 which has an International filing date of Nov. 29, 1996 which designated the United States of America, the entire contents of which are hereby incorporated by references.

TECHNICAL FIELD OF THE INVENTION

This invention relates to a simulated moving bed separation apparatus. More particularly, this invention relates to a simulated moving bed separation apparatus in which the whole of the concentration distribution formed in the simulated moving beds can be detected in real time; a simulated moving bed separation apparatus in which the operation conditions thereof can be determined in real time and which is able to separate each component out of a mixture containing a plurality of components with high recovery efficiency and little sample loss without turning out rejects; or a simulated moving bed separation apparatus in which the pattern of the change in the concentration distribution can be determined in real time, more precisely, the change in the operation conditions, especially the pattern of the change in the concentration (purity) distribution in one cycle or the pattern of the change in the concentration (purity) distribution in one unit step, and wherein the temperature, flow rate of each pump, step time, etc. are modified on the basis of the obtained pattern and which enables continuous stable separation and production of a product having a constant concentration.

TECHNICAL BACKGROUND

The chromatographic separation using a conventional simulated moving bed separation apparatus comprises connecting a plurality of filler-packed columns in series endlessly end to end so as to form a fluid circulation passage (or called fluid flow circuit) composed of filler beds, in which a liquid is circulated in one direction; introducing a stock solution, which is a mixture containing a component to be separated, and an eluent and, wherein a liquid containing the component to be separated and a liquid containing other components is discharged.

The filler beds in said simulated moving bed separation apparatus have an eluent inlet, and an outlet for discharging a liquid containing strongly adsorbable (this liquid is called "extract" and is rich in the strongly adsorbable substances), a stock solution inlet, and an outlet for discharging a liquid containing weakly-adsorbable substances (this liquid is called "raffinate" and is rich in weakly adsorbable substances) in the direction of fluid flow and in this order. These inlets and outlets are intermittently and successively shifted in the direction of fluid flow maintaining the relative positional relation in the fluid circulation passage.

Such a commercial scale simulated moving bed separation apparatus is based on a system developed by Universal Oil Products Company (UOP) in 1967 and today various improved simulated moving bed separation apparatuses are being developed by many engineering companies. A typical example is a chemical plant where the separation of fructose, glucose, etc. is carried out.

Generally, operation of such a system is controlled by accurately measuring flow rate at each pump incorporated in the fluid circulation passage of a simulated moving bed separation apparatus or at each zone formed in the fluid circulation passage, analyzing the measured data with a computer, providing the operator with the thus obtained flow rate control data and manually controlling the operation.

Also an apparatus having a system, which monitors by means of a concentration meter with low pressure resistance (usually withstanding a pressure of not higher than 10 $kg/cm^2$) provided in the fluid circulation passage, is known. In these proposed commercial scale simulated moving bed separation apparatuses, however, pressure resistance is generally set at not higher than 50 $kg/cm^2$ since ion exchange resins, synthesized adsorbents, inorganic adsorbents (zeolite, for instance), etc. whose particle diameter is not less than 200 $\mu$m are used. In simulated moving bed separation apparatuses using fillers for the HPLC level (1–100 $\mu$m in diameter), generally the system pressure of the employed monitoring system is higher than 50 $kg/cm^2$) In the simulated moving bed separation apparatus of this type, it is known that the employment of a shorter cycle type to increase the flow rate improves productivity.

In the current monitoring system and method of system control, it is desired to severely control the flow rate of the liquid circulating through the circulation passage. Further in the simulated moving bed separation apparatus using fillers of the type for HPLC, control of temperature and flow rate of the whole system must be more severely carried out than in the above-described low pressure system.

In simulated moving bed separation apparatuses using fillers of the type for HPLC, however, one cannot help determining the optimum operation conditions depending upon experience and intuition in order to produce products with consistent quality efficiently.

As an example of the monitoring method for chromatographic separation using a conventional low pressure simulated moving bed separation apparatus, it is known to measure the concentration of the solute discharged from the outlet every time the extract outlet of the raffinate outlet shifts intermittently with a constant time interval.

However, the concentration of the liquid discharged from the outlets is remarkably different between before and after the intermittent shifting of said outlets and, therefore, it is difficult to precisely monitor the concentration change. Also in the separation of optical isomers for instance, it is impossible to precisely grasp the separation state by mere monitoring of the concentration.

Japanese Laid-Open Patent Publication No. Hei 4-131104 discloses in "in a simulated moving bed chromatographic separation method, the method of controlling simulated moving bed separation process to adjust and maintain a predetermined component purity characterized by shortening or lengthening the interval with which the inlets and outlets are intermittently shifted by measuring the concentration of the fluid component at one or both of the inlet and outlet"

In the control method described in this patent publication, although the concentration is measured at the inlet a or outlet, time lag occurs because of the long distance between the outlet and the concentration detector making it impossible to obtain an accurate concentration determination. In addition to the time lag there is also diffusion and convection of the components in the extract and raffinate, and, therefore, an accurate concentration determination is impossible in this respect.

As described above, it was impossible to precisely determine the change in concentration or optical purity over time and to promptly judge the state of separation in the conventional simulated moving bed separation apparatus. As the state of separation cannot be judged instantly, it was impossible to set optimum operation conditions such as the time interval with which the inlet and outlet are intermittently shifted, flow rate and temperature of the circulating fluid, etc. and thus an efficient chromatographic separation was impossible.

An object of this invention is to provide a simulated moving bed separation apparatus which is able to accurately monitor concentration in each zone of the simulated moving beds. An object of this invention is to provide a simulated moving bed separation apparatus which can be operated with the same degree of simplicity as operating a liquid chromatographic apparatus. An object of the invention is to provide a simulated moving bed separation apparatus which can separate components a with high recovery rate, good productivity with and few rejects and little sample loss. Another object of this invention is to provide a simulated moving bed separation apparatus which can be easily and precisely operated without experience and intuition in operation of the apparatus.

An object of the invention is to provide a simulated moving bed separation apparatus with an incorporated automatic control system which enables real time monitoring of concentration pattern (purity pattern) in each zone, easy determination of the state of the operation and a long stable operation to produce a product of consistent quality.

Another object of the invention is to provide a simulated moving bed separation apparatus which achieves the technical effect of this invention.

DISCLOSURE OF THE INVENTION

This invention provides:

(1) in a simulated moving bed separation apparatus comprising a fluid circulation passage constituted of a plurality of endlessly connected filter beds, in which a fluid is forcibly circulated and an eluent inlet for introducing an eluent, an extract outlet for discharging a solution (extract) rich in adsorbable or strongly adsorbable substances, a stock solution inlet for introducing a stock solution containing a mixture of components to be separated and a raffinate outlet for discharging a raffinate rich in non-adsorbable or poorly adsorbable substances are provided in this order, wherein each inlet and outlet are intermittently shifted; the simulated moving bed separation apparatus characterized in that concentration detectors are installed in said fluid circulation passage;

(2) in said simulated moving bed separation apparatus of (1), the simulated moving bed separation apparatus which is further provided with either or both of a means for measuring concentration of a component in the extract discharged from the extract outlet and a means for measuring concentration of a component in the raffinate discharged from the raffinate outlet;

(3) in a simulated moving bed separation apparatus comprising a fluid circulation passage constituted of a plurality of endlessly connected filler beds, in which a fluid is forcibly circulated and an eluent inlet for introducing an eluent, an extract outlet for discharging a solution (extract) rich in adsorbable or strongly adsorbable substances, a stock solution inlet for introducing a stock solution containing a mixture of components to be separated and a raffinate outlet for discharging a raffinate rich in non-adsorbable or poorly adsorbable substances are provided in this order wherein each inlet and outlet are intermittently shifted;

the simulated moving bed separation apparatus characterized in that said apparatus is provided with a high pressure resistant concentration detector installed in said fluid circulation passage and a computer cooperative with said concentration detector, and thus is able to automatically modify the operation conditions in accordance with the concentration fluctuation of the object component caused by the fluctuation factors occurring in the simulated moving bed separation apparatus;

(4) in said simulated moving bed separation apparatus of (3), the simulated moving bed separation apparatus of said (3) which is further provided with either or both of a means for measuring concentration of a component in the extract discharged from the extract outlet and a means for measuring concentration of a component in the raffinate discharged from the raffinate outlet;

(5) in said simulated moving bed separation apparatus of said (4), in which the means for measuring concentration described in said (4) is further provided with a means for separating a desired component and undesired components in the extract or the raffinate sampled by a sampling means every predetermined period and a means for measuring the concentration of each component;

(6) in said simulated moving bed separation apparatus of said (4), in which the means for measuring concentration described in said (4) comprises plural different concentration meters for measuring concentrations of the desired component and undesired components; and (7) in said simulated moving bed separation apparatus of said (4), a simulated moving bed separation apparatus of said (4) wherein the means for measuring concentration is a single concentration detector which measures the concentration of the desired component and the undesired components in the extract or raffinate.

BEST MODE OF THE INVENTION

The simulated moving bed separation apparatus of this invention has a fluid circulation passage and concentration detectors.

Fluid Circulation Passage

The simulated moving bed separation apparatus of this invention has a fluid circulation passage comprising a plurality of filler beds containing a separation filler, which are endlessly connected, wherein a fluid can be forcibly circulated in one direction. The filler bed containing a separation filler is usually canned a "column". The industrial fluid circulation passage is formed by endlessly connecting a plurality of columns containing a separation filler by means of conduits such as pipes.

The fluid circulation passage is provided with a means for forcibly circulating fluid therein, whereby a fluid is circulated forcibly in one direction.

The forcible circulation means may be of any structure or any type insofar as is able to forcibly circulate fluid in one direction. For instance, a pump or pumps interposed in the fluid circulation passage can be referred to. A forcibly circulation means comprising a combination of pressure regulating valves which enable fluid circulation by regulating pressure balance, is an alternative when pumps are not used.

In the conduits which connect a column and a column of a fluid circulation passage, an eluent (otherwise called "desorbent") inlet for introducing eluent an extract outlet for discharging the strongly adsorbable components (also called "extract"), a stock solution (otherwise called "feed") inlet for introducing a stock solution and a raffinate (a solution rich in weakly adsorbable components) outlet for discharging a raffinate are provided in this order.

In the simulated moving bed separation apparatus of this invention, said eluent inlet, extract outlet, stock inlet and raffinate outlet are provided along the flow of the circulated fluid in this order so that they can be shifted intermittently maintaining the order thereof. Switching-over of the inlets and outlets is effected by way of a rotary valve or switching of an on-off valve.

Until an inlet or an outlet is changed to an outlet or an inlet respectively, the filler beds between the eluent inlet and the extract outlet work as a desorption zone, the filler beds between the extract outlet and the stock inlet work as a concentration zone, the filler beds between the stock inlet and the raffinate outlet work as a refining zone and the filler beds between the raffinate outlet and the eluent inlet work as an adsorption zone.

In said desorption zone, the eluent introduced through the eluent inlet flows together with the flowing fluid in the filler beds, contacts the separation filler and makes the adsorbed components (strongly adsorbable components, also called "easily adsorbable components") desorb therefrom and thus is discharged as an extract out of the extract outlet. In this desorption zone, the strongly adsorbable component concentration in the filler is practically zero at the part immediately after the eluent inlet and the strongly adsorbable component concentration gradually increases in the zone in the direction of the fluid flow.

In the concentration zone, the weakly adsorbable components (components which is not easily adsorbed or not adsorbed, otherwise called "poorly adsorbable components") in the stock solution introduced through the stock solution inlet is adsorbed on the separation filler and strongly adsorbable components are desorbed from the filler. In this concentration zone, weakly adsorbable components are adsorbed on the separation filler while the strongly adsorbable components are desorbed from the separation filler in the range from the extract outlet and the stock solution inlet and thus the strongly adsorbable component concentration in the flowing fluid turns to decrease in the direction of the fluid flow, but the weakly adsorbable component concentration in the flowing fluid begins to increase.

In the refining zone, the strongly adsorbable components in the stock solution introduced through the stock solution inlet are adsorbed on the separation filler and the weakly adsorbable components adsorbed on the separation filler are desorbed therefrom. In this refining zone, the strongly adsorbable component concentration practically comes close to zero in the range from the stock solution inlet to the raffinate outlet, but the weakly adsorbable component concentration increases and thus a fluid containing a high concentration of the weakly adsorbable components is discharged out of the raffinate outlet.

In the adsorption zone, the weakly adsorbable components are completely desorbed and the separation filler adsorbs the adsorbable components while only the eluent which contains substantially neither weakly adsorbable components nor sstrongly adsorbable components is introduced into the recycling line. In this adsorption zone, the weakly adsorbable component concentration in the flowing fluid decreases until it reaches substantially zero.

Separation Filler

The columns are filled with a separation filler, which can adsorb the components to be separated. As preferred examples, fillers for liquid chromatography (LC), positive phase fillers and negative phase fillers for instance can be referred to.

Specific examples of suitable separation fillers are various kinds of known fillers used for isomer separation for instance. For instance, optically active polymeric compounds as optical isomer resolution fillers and optical resolution fillers comprising low molecular compounds having optical resolution activity can be referred to. As said optically active polymeric compounds, fillers comprising silica gels bearing polysaccharide derivatives (esters or carbaminates of cellulose, amylose, etc.), polyacrylate derivatives or polyamide derivatives, bead type fillers comprising particles of said polymers using no carriers, cross-linked type fillers which are formed by cross-linking polymers, etc. can be referred to. As low molecular compounds having optical resolution function, amino acids or their derivatives, crown ether and its derivatives, cyclodextrins and their derivatives etc. can be referred to. These low molecular compounds are usually supported on a carrier, i.e., an inorganic carrier such as silica gel, alumina, zirconia, titanium oxide, silicate salt, diatomaceous earth, etc.; an organic carrier such as polyurethane, polystyrene, polyacrylate derivatives can be referred to.

Also commercial products of optical resolution fillers can be used. For instance, CHIRALCEL OB®, CHIRAL OD®, CROWNPAK CR(+)®, CHIRALCEL CA-1®, CHIRALCEL OA®, CHIRALCEL OK®, CHIRALCEL OJ®, CHIRALCEL OC®, CHIRALCEL OF®, CHIRALCEL OG®, CHIRALCEL WH®, CHIRALCEL WM®, CHIRALCEL WE®, CHIRALCEL OT(+)®, CHIRALCEL OP(+)®, CHIRALCEL AS®, CHIRALCEL AD®, CHIRALCEL OJ-R®, CHIRALCEL OD-R®, etc. manufactured by Daicel Chemical Industries, Ltd. can be referred to as preferred examples.

The average particle diameter of the separation filler packed in columns is usually 1–100 µm, preferably 2–50 µm, although it varies depending upon components to be separated, volume flow rate of the solvent which flows in the columns, etc. However, the average particle diameter of separation fillers should preferably be 10–50 µm in order to keep small the pressure loss in the columns which constitute a simulated moving bed separation apparatus. If the average particle diameter of the separation filler is in the above range, the pressure loss in a simulated moving bed separation apparatus can be kept small, not higher than 50 $kgf/cm^2$ for instance. On the other hand, the greater the average particle diameter of the separation filler, the lower the number of theoretical plates in adsorption. Therefore, the preferred average particle diameter of the separation fillers will be usually 15–75 µm if only a practical number of theoretical plates is desired.

Eluents

As eluents to be fed into the fluid circulation passage, alcohols such as methanol, ethanol, isopropanol, etc.; hydrocarbons such as pentane, hexane, heptane, etc.; other various organic solvents; mixture thereof; mixtures of polar organic solvents such as methanol, acetonitrile and water plus a buffer; etc. can be referred to. These eluents can be used as either positive phase moving phase or negative phase moving phase. A preferred eluent is suitably determined depending upon species of the components or compounds to be separated. An eluent may contain a basic substance such as diethylamine or an acid substance such as acetic acid as an additive, which can improve separation ability.

Stock Solution

Stock solution to be fed in the fluid circulation passage are not specifically limited insofar as they are a binary or multicomponent mixture containing solutes to be separated. For instance, various compounds used in the fields of drug, pesticide, food, livestock feed, perfumery, etc. such as thalidomide as a drug, EPN as an organic phosphorus pesticide, monosodium glutaminate as a seasoning, menthol as a perfume, etc. can be referred to. They further include optically active alcohols, optically active esters, etc. Said solutes are optical isomers, position isomers, mixtures of components, some of which are desired and some of which are undesired in some viewpoint, etc. In this invention, solutes may be multicomponent mixtures of components to be separated such as ternary or quaternary mixtures. When a multicomponent mixture is separated by means of the simulated moving bed separation apparatus of this invention, a desired component can be obtained by separating a group containing said desired component and another group containing no desired component and separating the group containing said desired component into a smaller group containing said desired component and another smaller group containing no desired component and thus repeating this procedure required times. Also a desired component can be separated from a multicomponent mixture by combined use of a batch treatment with a separation apparatus other than the simulated moving bed separation apparatus and a simulated moving bed separation apparatus of this invention.

Concentration Detector in Fluid Circulation Passage

In the simulated moving bed separation apparatus of this invention, at least one concentration detector is provided in said fluid circulation passage.

Concentration detector is a means which detects the concentration of a solute in the solution which flows through the fluid circulation passage. Generally the conception of "concentration" is the existence ratio of a particular component in an object. Therefore, the term "concentration" can be taken for "purity" depending upon the situation or occasion.

The concentration detector can be, for example, a concentration detector utilizing electromagnetic wave, acoustic concentration detector, electrical concentration detector, and a magnetic concentration detector. Specifically, concentration detectors utilizing electromagnetic waves such as near ultraviolet radiation, ultraviolet radiation, visible light, infrared radiation, far infrared radiation, etc.; differential refractometer, turbidimeter, concentration detector utilizing ultrasonic wave; concentration detector utilizing ion electrode; concentration detector utilizing a pH meter, concentration detector utilizing a polarimeter, etc. can be used.

It is determined in accordance with the species of the solute which concentration detector should be used. For instance, if a solute has specific absorption pattern for an electromagnetic radiation, UV detector, IR detector, fluorescence detector, color sensor, LED detector, and other various detectors can be employed according to measurement object. If a solute exhibits ionic property under the operation condition, pH meter, conductivity detector, electrochemical detector, etc. can be employed. For other solutes such as sugar, lipids, which cannot be detected with the above-mentioned detectors, differential refractometer, ultrasonic detector, turbidimeter, etc. can be suitably employed. In this invention, whichever concentration detector is used, when a concentration detector is provided in the fluid circulation passage, the concentration detector should preferably withstand a pressure of at least 50 $kg/cm^2$, preferably 100–500 $kg/cm^2$.

Although a concentration detector may be installed in a column, preferably it is installed in a conduit connecting a column to another. A plurality of concentration detectors may be installed. Generally speaking, the higher the number of installed concentration detectors, the shorter time the concentration distribution in the solution flowing in the fluid circulating passage can be determined. That is, the real time monitoring of the concentration is easily achieved. In the commercial scale operation, however, usually one, two or three detectors are installed in the fluid circulation passage, especially in the conduits connecting a column and a column.

The concentration detectors installed between columns function as purity detectors in some case. For instance, optical isomers are separated by using the simulated moving bed separation apparatus of this invention, polarimeters are installed between columns as concentration detectors, the purity of each optical isomer in each column can be calculated, because each optical isomer has its own optical rotary power different from each other. When multiple wave length UV detectors are installed between columns as concentration detectors, purity of each component can be calculated from the absorption intensity at two or more points if the UV patterns of the object components to be separated are different. The multiwave UV detector is an example of the detector which can detect the concentrations or purities of a plurality of solutes.

When a plurality of concentration detectors are installed between columns, the concentration detectors are installed at the positions near to each other, if these concentration detectors are of different kinds, the purities of the components can be calculated by analyzing the data of the concentration detectors. For instance, if only the desired compound absorbs fluorescent light or any other specific radiation, the concentration thereof and thus purity thereof can be calculated by first measuring the overall concentration of the entire components by a concentration detector and then measuring the fluorescent light absorption by a fluorescence detector as a concentration detector.

If concentration detectors are installed at the raffinate discharging outlet, the extract discharging outlet, or in the recycling line (a conduit connecting the first column and the last column) in some cases in addition to between columns, accuracy and reliability in controlling the operation conditions can be improved. It will be determined by considering the difficulty and cost of separation how many concentration detectors should be installed at which outlets or recycling line.

In the simulated moving bed separation apparatus of this invention, the detection signals output from the concentration detectors are input into an operation controller.

In the operation controller, the concentration of a solute is calculated from the data output from the concentration detector. For instance, when one concentration detector is installed in the fluid circulation passage, every time the position of the inlets and the outlets are shifted, the concentration detector detects the concentration of the solute and the control condition is modified at every end of a cycle of shifting. When a plurality of concentration detectors are installed, it is advantageous in that the time required for the modification is shorter and the information on the concentration distribution in each zone (each column) can be obtained in a higher degree of accuracy. Further, specific material balance can be learned instantly from the concentration detectors installed for the raffinate, extract and recycling line.

In this invention, the information is processed at the operation controller and display with a display means such as a CRT. Further in this invention, not only is the concentration change but also the information is instantly learned which enables minimizing the time required for step time shift, fluctuations in the flow rate of the fluid in the fluid circulation passage, temperature of the fluid, pressure and temperature in the columns, etc. and reverting to the predetermined optimal conditions or operation conditions can be automatically modified so that the concentration patterns in each zone revert to the predetermined desired patterns.

As a structure incorporating the operation controller, display means, etc., an ordinary computer can be used to. The computer includes a CPU memory storage, etc. and can readily carry out the above described processing in the operation controller.

When the operation conditions are modified, the operation controller can usually monitor several cycles of operation and if necessary, provide the operator with normal, warning and alarming conditions.

According to our study, it was revealed that the fluctuation in each zone is influenced even by very slight changes in temperature and flow rate after a long time operation of 20–200 cycles for the reason which cannot explained by the operation of 10 cycles or so. There are different patterns in the concentration (purity) change at the start of the operation from stock solution to stock solution. For instance, some stock solution requires a very long time before the equilibrium is reached. In other words, the adsorption behavior pattern is different from stock solution to stock solution and thus the time required to reach the equilibrium is different. It is considered that the difference is caused by the complicated combination of interactions between the separation filler and the stock solution resulting from its long residence in the stock solution in the columns or its residence in the transitional equilibrium state and an interaction between the various compounds in the stock solution.

Therefore, a wide variety of methods and procedures and a wide condition range are required in controlling the operation of this simulated moving bed separation apparatus.

In this invention, a desired concentration (purity) threshold value (set point) is defined and a variation range is set for each control factor such as step time, flow rate in the fluid circulation passage, pressure in the columns in order to meet the diversity of fluctuation in the zones caused by stock solutions. According to our study, it was found that the variation ranges in said threshold values and control factors can be defined by analyzing the fluctuation factors in a considerably long operation with a separation filler having a particle diameter of 20 $\mu$m for instance. On the basis of this finding, a stable efficient continuous operation is possible in the operation of a simulated moving bed separation apparatus comprising columns containing a separation filler having an average particle diameter of 1–10 $\mu$m, even if high accuracy control in flow rate and temperature is required, and even in an environment where the temperature fluctuates in $\pm 3°$ C.

In this invention, the solute concentration is calculated by the operation controller, and command signals for controlling operation conditions are relayed in accordance with the result of the calculation. As command signals, a command signal for modifying flow rate of each pump, a command signal for modifying column temperature (column temperature, temperature of the solution such a stock solution introduced into the fluid circulation passage, etc.), a command signal for changing the shift time for introducing and discharging of a fluid into columns (step time), etc. can be used.

Means for Concentration Measurement

A preferred simulated moving bed separation apparatus of this invention is further provided with a means for concentration measurement.

The concentration measurement means is installed so as to measure concentration or purity of a component of a solution in the extract or raffinate or both.

The a concentration measurement means, if described with respect to an extract, can comprise a means for measuring the concentration and purity of a solute in a predetermined amount of the sample taken by a sampling means from the extract discharged from the extract outlet. Or if described with respect to a raffinate, the concentration measurement means can comprise a means for measuring concentration and purity of a solute in a predetermined amount of a sample taken by a sampling means from a raffinate discharged through a raffinate outlet. A preferred example of this sampling means is an apparatus comprising a conduit connected to an extract outlet or a raffinate outlet, a six way switching valve means connected to the conduit, a sample tube connected to the six way switching valve means and a fluid drive means including a pump connected to the six way switching valve means. This sampling means draws a predetermined amount of a sample into the sampling tube from the extract outlet or the raffinate outlet by switching of the six way switching valve means and drives out a predetermined amount of the extract or raffinate in the sample tube by switching of the six way cock valve means.

The means for measuring concentration of components is a means for measuring the concentration and purity of a sample taken from the extract and/or raffinate. Although the extract or raffinate contains only one kind of solute in some case, usually a plurality of solutes are contained in the commercial scale production. In the case of a stock solution containing a mixture of optical isomers, the D isomer and the L isomer for instance, when the solution containing the D isomer is discharged from the extract outlet and the solution containing the L isomer is discharged from the raffinate outlet for instance, the extract contains impurities and the D isomer as solutes.

In this means for measuring concentration, therefore, (1) a desired component is separated from the undesired components and the concentrations of the separated components are measured or (2) the concentration or purity of a desired component can be measured by measuring the concentration of the desired component on the basis of specific character thereof and measuring the concentrations of undesired components on the basis of the characters thereof without physically separating the solutes in a sample into the desired component and the undesired components, that is, measuring the concentrations of the components with two or more concentration detectors.

For physical separation of a plurality of solutes in a sample in the means for measuring component concentration, various separation means are employed. As such separation means, column separation apparatus, HPLC separation apparatus, GC separation apparatus, IR separation apparatus, capillary electrophoretic apparatus, etc. can be used.

In this invention, these separation means are connected to the raffinate outlet and the extract outlet and used for measuring concentration and purity of the object component. Generally the same filler as used in the simulated moving bed separation apparatus is preferred and an HPLC column separation apparatus filled with a small size particles such as 1–10 $\mu$m, which enables separation in a very short time, is preferred.

The concentration of the solute separated by the above described separation apparatus is measured by a concentration detector similar to the concentration detector installed in the fluid circulation passage. As concentration detectors, concentration detector utilizing electromagnetic wave, acoustic concentration detector, electrical concentration detector, magnetic concentration detector, etc. can be referred to. Specific examples are concentration detectors utilizing near UV radiation, UV light, visible light, IR radiation, far IR radiation; differential refractometer, turbidimeter, concentration detector utilizing ultrasonic wave, concentration detector utilizing ionic electrode, concentration detector utilizing pH meter, concentration detector utilizing polarimeter, etc. Which concentration detector should be used is determined depending upon the species of the solute.

In the case where a means for physically separating the solutes is not employed, a combination of a plurality of conentration detectors or one concentration detector which can measure concentrations of a plurality of solutes simultaneously is employed. When a plurality of concentration detctors are used, one concentration detector measures the concentration of a particular solute and the other concentration detectors measure the concentrations of the other solutes. When one concentration detector is used, the concentration detector measures concentrations of a plurality of solutes.

If the purity of an optical isomer is to be measured as concentration, a desirable concentration detector will be a polarimeter. When a plurality of concentration detectors are used in combination, a combination of an IR spectrophotometer and a UV spectrophotometer is employed and purity can be measured in such a way that the concentration of a particular component can, for instance, be measured by the IR spectrophotometer and the concentration of another particular component can be measured by the IR spectrophotometer and the UV spectrophotometer.

The data on the concentration (purity) of a particular component measured by the means for measuring the component concentration is input to the operation controller.

In the operation controller, the operation control conditions of the simulated moving bed separation apparatus are determined on the basis of the concentration data from the above-described concentration detector and the concentration data from the means for measuring concentration.

The control by the operation controller based on the concentration data from the above-described means for measuring concentration installed in the fluid circulation passage is different from the control by the operation controller based on the concentration data from the concentration detector.

In the control by the operation controller based on the two kinds of concentration data from the concentration detector and the means for measuring concentration, the operation controller first monitors the concentration data from the concentration detector. The concentration of a particular component determined by the concentration data from the concentration detector is measured time-serially and the zone fluctuation is monitored by setting a time from a base concentration at the moment when the extract or raffinate outlet is shifted to a certain threshold value of a base. Generally the concentration at the moment when the raffinate outlet is shifted is close to zero, the concentration increases as time passes, and is the highest immediately before the next shift. At the extract outlet, the concentration is the highest at the moment of the shift and decreases as time passes. According to the time until the concentration value detected by the concentration detector reaches a certain threshold value and the purity given by the means for measuring concentration, the operation controller can output any one of the control commands as indicated in Table 1 for the raffinate and any one of the control commands as indicated in Table 2 for the extract. Among the various control commands, the most commonly used is the command to modify flow rate.

TABLE 1

Control of Raffinate

| Time until conc. reaches threshold | Whether purity reaches threshold or not | Control message |
| --- | --- | --- |
| Short | Purity OK | (1) Increase flow rate of desorbent pump<br>(2) Decrease flow rate of extract pump<br>(3) Lengthen step time<br>(4) Raise temp. of fluid in circulation passage<br>(5) Increase flow rate of feed pump<br>(6) Increase flow rate of recycling pump |
| Short | Purity NG | (1) Decrease flow rate of desorbent pump<br>(2) Increase flow rate of extract pump<br>(3) Shorten step time<br>(4) Drop temp. of fluid in circulation passage<br>(5) Decrease flow rate of feed pump<br>(6) Decrease flow rate of recycling pump |
| Long | Purity NG | (1) Decrease flow rate of desorbent pump<br>(2) Increase flow rate of extract pump<br>(3) Shorten step time<br>(4) Drop temp. of fluid in circulation passage<br>(5) Decrease flow rate of recycling pump |
| Long | Purity OK | (1) Increase flow rate of desorbent pump<br>(2) Decrease flow rate of extract pump<br>(3) Lengthen step time<br>(4) Raise temp. of fluid in circulation passage<br>(5) Increase flow rate of feed pump<br>(6) Increase flow rate of recycling pump |

TABLE 2

Control of Extract

| Time until Conc. Reaches Threshold | Whether purity reaches threshold or not | Control message |
| --- | --- | --- |
| Short | Purity OK | (1) Decrease flow rate of desorbent pump<br>(2) Increase flow rate of extract pump<br>(3) Shorten step time<br>(4) Drop temp. of fluid in circulation passage<br>(5) Increase flow rate of feed pump<br>(6) Decrease flow rate of recycling pump |
| Short | Purity NG | (1) Increase flow rate of desorbent pump<br>(2) Decrease flow rate of extract pump<br>(3) Lengthen step time<br>(4) Raise temp. of fluid in circulation passage<br>(5) Decrease flow rate of feed pump<br>(6) Increase flow rate of recycling pump |
| Long | Purity NG | (1) Increase flow rate of desorbent pump<br>(2) Decrease flow rate of extract pump<br>(3) Lengthen step time<br>(4) Raise temp. of fluid in circulation passage<br>(5) Decrease flow rate of feed pump<br>(6) Increase flow rate of recycling pump |
| Long | Purity OK | (1) Decrease flow rate of desorbent pump<br>(2) Decrease flow rate of extract pump<br>(3) Shorten step time<br>(4) Drop temp. of fluid in circulation passage<br>(5) Increase flow rate of feed pump<br>(6) Decrease flow rate of recycling pump |

In Tables 1 and 2, the "threshold" in "whether the purity reached a threshold value or not" is a predetermined value. The threshold varies depending upon the object substance, and it can be determined by correlating the purity and concentration of the raffinate and the purity and concentration of the extract and the concentration (purity) pattern.

The correlation of these relations can be made more accurate by a method of pattern recognition, for instance, by analyzing the relation between the concentration fluctuation in each column (zone) brought about by fluctuation in the system caused during a long period of running and the product purity. The data is stored in the memory means in the operation controller and finally can be used to respond to the fluctuation in the system. How long is the time until the set point is reached is suitably determined in accordance with the kind of the object substance to be separated, operation and scale of the simulated moving bed separation apparatus, etc.

In Tables 1 and 2, the threshold value in "whether the purity has reached the predetermined threshold value or not" is a predetermined value, and is suitable determined by considering species of the object substance to be separated, the scale of the simulated moving bed separation apparatus, etc.

In the simulated moving bed separation apparatus of this invention, it is preferred that the apparatus is provided with a display means which indicates the concentration distribution of a component in question grasped by the operation controller in the fluid circulating in the fluid circulation passage, and the purity.

As display means, printer CRT, etc. can be referred to. If the concentration distribution in the fluid circulation passage is displayed as a graph on the screen of a CRT, the situation will be visually gasped easily and conveniently.

Example

Now the invention specifically described below.

Figure 1:
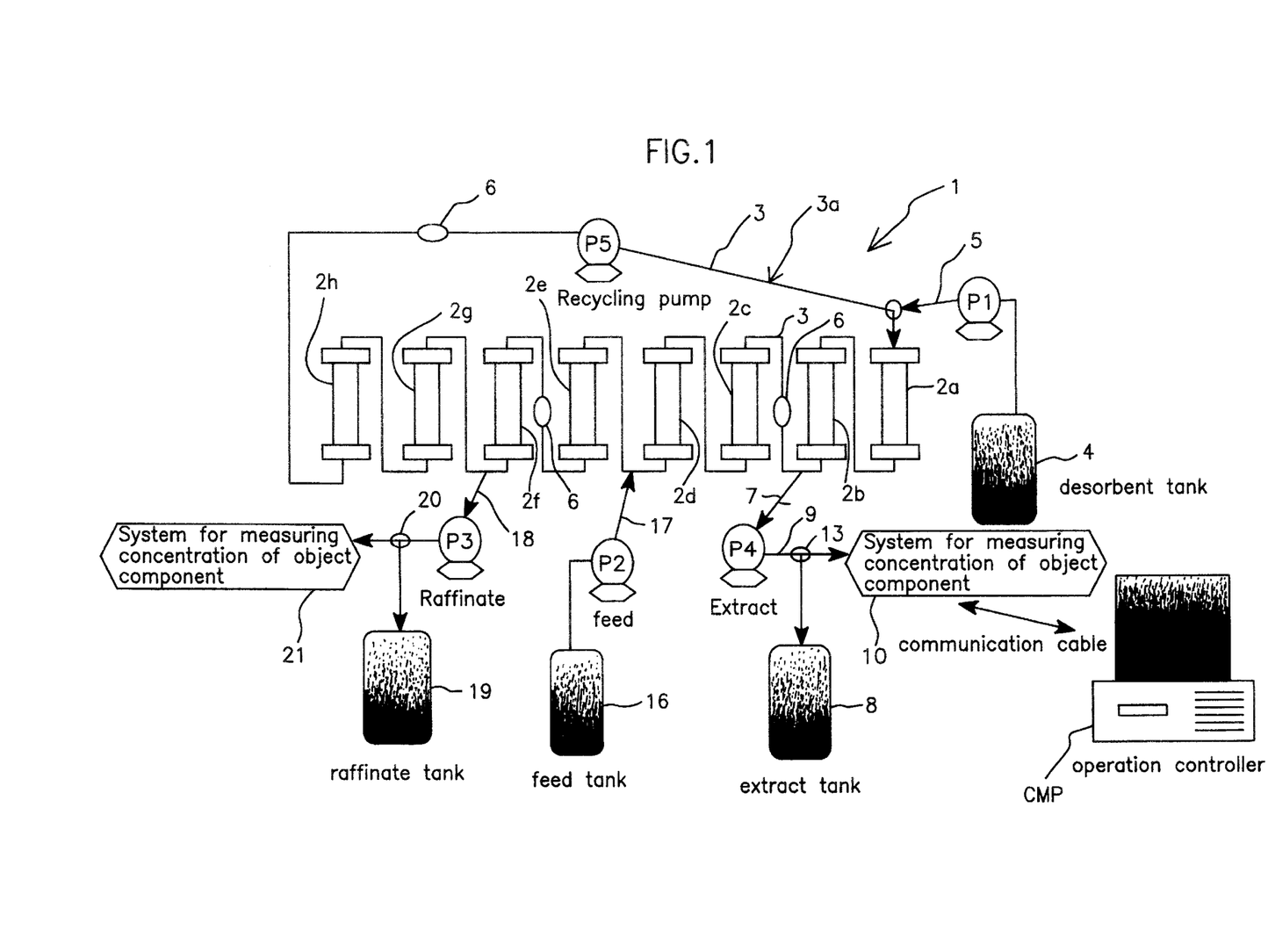
FIG. 1 is an illustration of an example of the simulated moving bed separation apparatus of this invention.

As shown in FIG. 1, the simulated moving bed separation apparatus 1, which is an embodiment of this invention, has a first to a eighth column (otherwise called unit filler bed) 2a–2h. The inlet of each column is connected to the outlet of the next column by means of a conduit and all the columns are endlessly connected to form a fluid circulation passage. The fluid circulation passage is equipped with a recycling pump which forcibly circulates a fluid, an eluent-inlet for introducing an eluent, an extract outlet for discharging an extract a stock solution (feed) inlet for introducing a stock solution and a raffinate outlet for discharging a raffinate and the inlets and the outlets are constructed so as to be shifted to the next position by one column with a predetermined time interval.

FIG. 1 shows the inlets and the outlets of a simulated moving bed separation apparatus at a point of time. At this point of time, the outlet of the 8 column 2h and the inlet of the 1st column 2a connected by means of a conduit 3. The conduit 3 connecting the outlet of the 8th columns and the inlet of the 1st column 2h is furnished with a recycling pump P5 for forcibly circulating a fluid in the fluid circulating passage from the 8th column 2h to the 1st column 2a. FIG. 1, the conduit 3 which connects the outlet of the 8th column and the inlet of the 1st column with a recycling pump P5 interposed is especially called recycling line 3a. Generally, the recycling line means a fluid passage from the outlet of the last of the columns which form an adsorption zone to the inlet of the inlet of the first of the columns which form a desorption zone. Midway in the recycling line where the fluid, which has been sent out of the recycling pump P5, reaches the inlet of the of the 1st column 2a, a conduit 5, which leads an eluent (desorbent) stored in a desorbent tank 4 to the inlet of the 1st column 2a by means of a desobent pump P1, is connected.

This fluid circulation passage is furnished with a switching means for shifting the eluent inlet (not shown), and constructed so that the eluent inlet communicating with the eluent-introducing conduit 5 is shifted from the inlet of the 1st column 2a to the inlet of the 2nd column 2b, from the inlet of the 2nd column 2b to the inlet of the 3rd column 2c and so on at a predetermined time interval.

The switching means for shifting the eluent inlet is a rotary valve in this example.

As shown in FIG. 1, in the conduit 3 communicating the outlet of the 2nd column and the inlet of the 3rd column, the conduit 3 communicating the outlet of the 5th column 2e and the inlet of the 6th column 2f and the conduit 3 communicating the outlet of the 8th column and the recycling pump P5, respectively concentration detectors 6 are installed.

Figure 2:
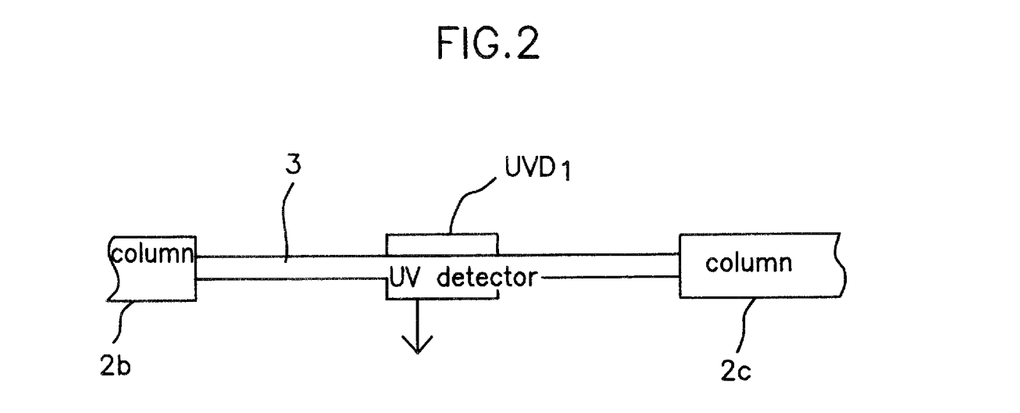
FIG. 2 is an illustration showing a UV meter as a concentration detector installed in a conduit communicating a column and another column in the fluid circulation passage.

As shown in FIG. 2, the conduit 3 is furnished with a first UV detector UVD1 as a concentration detector. The first UV detector UVD1 outputs the detected data as electrical signals to the operation controller CMP (Refer to FIG. 1.)

The first UV detector UVD1 is not specifically limited in its structure, kind or type insofar as it has the function that radiates UV rays of a particular wave length through a quartz cell, etc. and detects the attenuation of the transmitted light of a particular wave length, whereby it outputs an electric signal corresponding to the concentration of a particular component, a poorly adsorbable component for instance. A known UV detector used for known liquid chromatography can be suitably used for instance.

As shown in FIG. 1, a discharging conduit 7 is connected to the to the conduit 3, which connects the outlet of the 3rd column 2c and the inlet of the 4th column 2d, and the extract discharged from the extract-discharging conduit 7 is sent to an extract tank 8 via an extract-discharging pump P4.

The fluid circulation passage is furnished with a switching means for shifting the extract-discharging outlet (not shown in the ddrawing), and constructed so that the connection of the extract discharging conduit 7 to the conduit 3 can be shifted from the conduit 3 connecting the outlet of the 3rd column 2c and the inlet of the 4th column 2d, to the conduit 3 connecting the outlet of the 4th column 2d and the inlet of the 5th column 2e, and so on at a predetermined time interval.

The switching means for shifting the extract outlet is a rotary valve in this example.

Midway in the extract-discharging conduit 7 between the extract-discharging pump P4 and the extract tank 8, a six way cock valve 13 is interposed (FIG. 3), via which a system for measuring the concentration of the object component 10 is installed.

Figure 3:
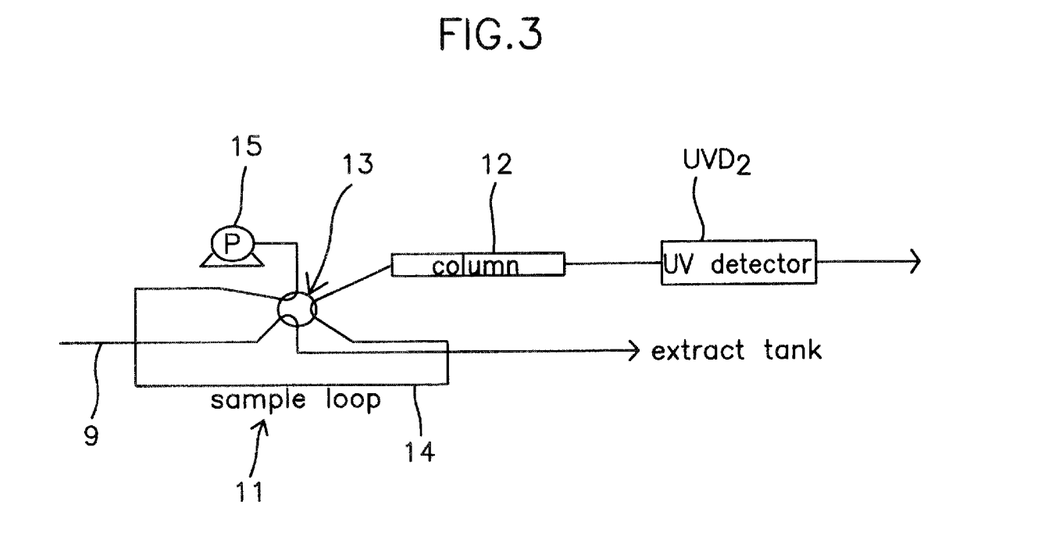
FIG. 3 is an illustration showing a means for measuring concentration which analyzes of a component in the extract discharged from the extract outlet.

This system for measuring the concentration of the object component 10 is a means for measuring concentration of a component in this invention. In this example, the system for measuring the concentration of the object component 10 comprises, as shown in FIG. 3, a first separation column 12, which is a means for separating a component in the sampled extract by a sampling means 11 and a second UV detector UVD2, which is the means for measuring the concentration of each component in the extract.

Figure 4:
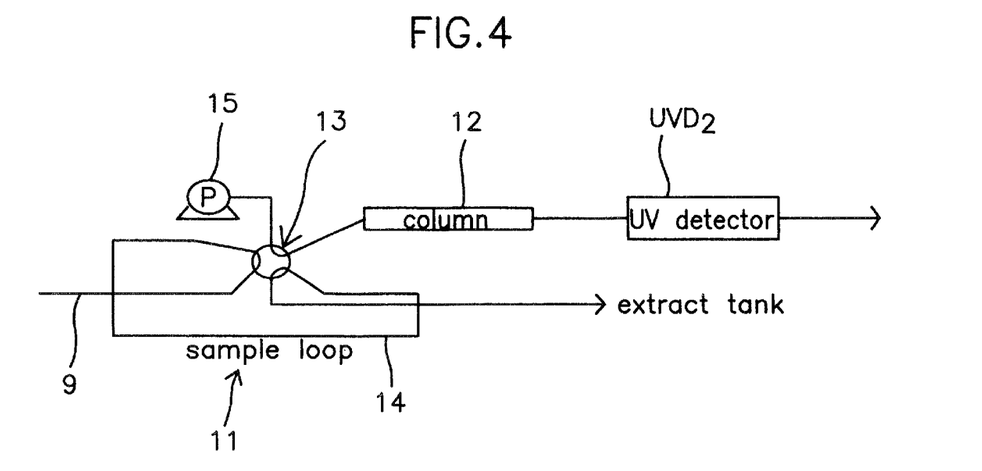
FIG. 4 is an illustration explaining the operation of said means for measuring the concentration of the component.

This sampling means 11 is provided with a conduit 9 which passes an extract sent forth from an extract-discharging pump P4, a six way rotary switching valve 13 communicating with the conduit 9, a sample tube 14 which communicartes with the six way switching valve 13 and a pump 15 which communicates with the six way switching valve 13. In this sampling means, as shown FIG. 4, the six way switching valve 13 is rotated so that the conduit 9, the six way rotary switching valve 13 and a sample tube 14 communicate. Then the extract having passed through the extract-discharging conduit 7 is collected in the sample tube 14. Thereafter, as shown in FIG. 3, the six way rotary valve 13 is rotated so that the extract in the sample tube 14 is driven into the first separation column 12 by means of a pump 15.

The first separation column 12 is filled with a filler suitable for collecting a particular component but the filler packed in the first to eighth columns 2a–2h can be suitable used.

Figure 5:
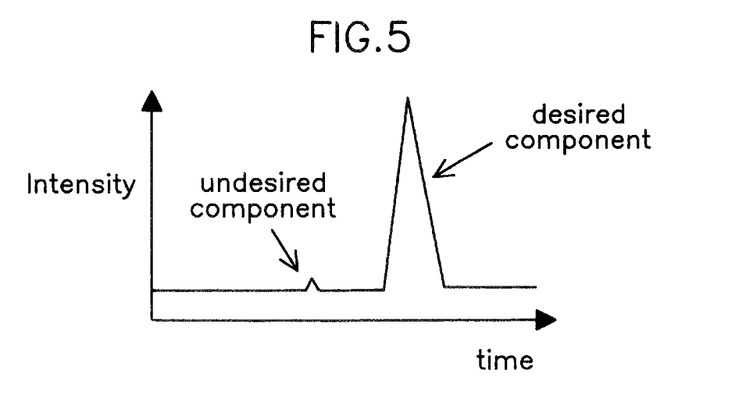
FIG. 5 is a graph showing the state of separation of the components in an extract discharged from the extract outlet, wherein the ordinate represents intensity, that is, intensity of electrical signal output from the concentration detector.

When the extract is passed through the first separation column 12, the object component in the extract (desired component, adsorbable of strongly adsorbable) and undesired component (undesired component, poorly adsorbable or non-adsorbable) are separated. The undesired component in the extract is first separated and thereafter the desired component is separated as shown in FIG. 5.

Then the second UV detector UVD2 irradiates UV light to each component separated from the extract and outputs electrical signals corresponding to the concentration of each component (desired or undesired).

In the simulated moving bed separation apparatus 1 of this example, as shown in FIG. 1, a conduit 17, which introduces a stock solution from a feed tank 16, in which it is stored, by means of a feed pump P2, is connected to a conduit 3 connecting the outlet of the 4th column 2d and the inlet of the 5th column.

In this fluid circulation passage, a switching means for shifting the stock solution-introducing inlet (not shown in the drawing) is provided and the connection of the stock solution introducing conduit 17 to the conduit 3 is shifted from the conduit 3 connecting the outlet of the 4th column 2d and the inlet of the 5th column 2e to the conduit 3 connecting the outlet of the 5th column 2e and the inlet of the 6th column 2f and so on successively at a predetermined time interval.

The switching means which shifts the inlet for introducing the stock solution in this example is a rotary valve.

As shown in FIG. 1, a raffinate-discharging conduit 18 is connected to the conduit 3 connecting the outlet of the 6th column 2f and the inlet of the 7th column 2g, the raffinate discharged through the raffinate-discharging conduit 18 is sent to a raffinate tank 19 by means of a raffinate-discharging pump P3.

In this fluid circulation passage, a switching means for shifting the raffinate-discharging outlet (not shown in the drawing) is provided and the connection of the raffinate-discharging conduit 18 to the conduit 3 is shifted from the conduit 3 connecting the outlet of the 6th column 2h and the inlet of the 7th column 2g, to the conduit 3 connecting the outlet of the 7th column and the inlet of the 8th column 2h and so on successively by the operating of the switching means.

The switching means for shifting the raffinate-discharging outlet is a rotary valve in this example.

Midway in the raffinate-discharging conduit 18 between the raffinate-discharging pump P3 and the raffinate tank 19, a six way rotary switching valve 20 is provided, through which a system for measuring the concentration of the object component. 21 is provided.

This object component concentration measuring system 21 is the means for measuring component concentration of this invention which measures the concentration of the undesired component in the raffinate. In this example, this object compound concentration measuring system 21 comprises a second separation column (not shown in the drawing) and a third UV detector (not shown in the drawing) in the same way as in the object component concentration measuring system 10 for measuring the concentration of the desired component in the extract.

The structure and connection of this sampling means, the second separation column and the third UV detector are the same as those of the object component concentration measuring system 10 and, therefore, detailed description is omitted.

The second separation column is filled with a preferred filler and usually a filler similar to that packed in the 1st to 8th columns 2a–2h is used.

Figure 6:
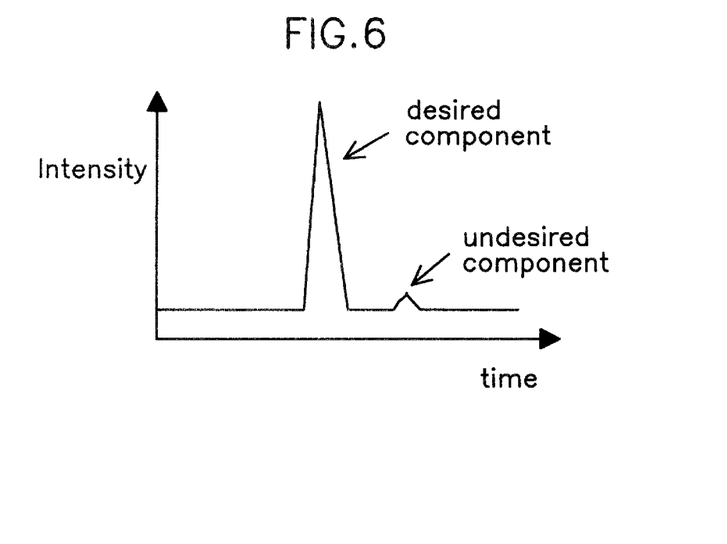
FIG. 6 is a graph showing the state of separation of the components in a raffinate discharged from the raffinate outlet, wherein the ordinate represents intensity, that is, intensity of electrical signal output from the concentration detector.
Figure 7:
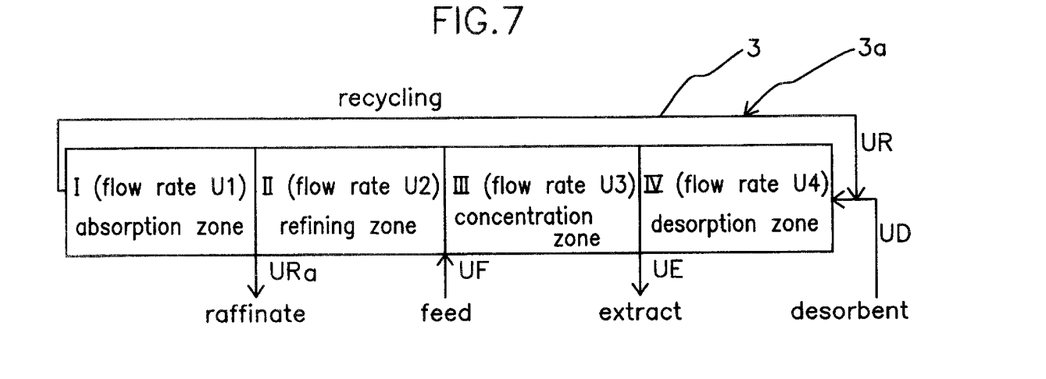
FIG. 7 is a schematic illustration of the concentration pattern formed in the 8 columns connected in series constituting a fluid circulation passage.

When the raffinate is passed through the second separation column, an object component (undesired component, non-adsorbable of poorly adsorbable) and the undesired component as shown in FIG. 6 are separated.

The third UV detector irradiates UV light to each component separated from the raffinate and outputs electrical signal corresponding to said component.

In the simulated moving bed separation apparatus as shown in FIG. 1, there are formed four zones as shown in FIG. 1.

Of these four zones, in the adsorption zone for instance, the flow rate U4 of a fluid is the sum of the flow rate UR of the fluid flowing in the recycling line 3a and the flow rate UD of the eluent which is introduced, i. e., U4=UR+UD, and the flow rate of the fluid flowing in the concentration zone U3 is the difference of the flow rate U4 of fluid flowing in the desorption zone and the flow rate UE of the fluid which is discharged from the extract outlet, i.e., U3=U4–UE, the flow rate U2 of a fluid flowing in the refining zone is the sum of the flow rate U3 of the fluid in the concentration zone and the flow rate UF of a stock solution introduced from the stock solution inlet, i.e., U2=U3+UF; the flow rate U1 of the fluid in the adsorption zone is the difference of the flow rate U2 of the fluid in the refining zone and the flow rate Ura of the raffinate discharged from the rafinate outlet, i.e., U1=U2–Ura.

Thus in the simulated moving bed separation apparatus shownin FIG. 1, a fluid circulation passage is formed, in which a fluid flows in the order of the 8th column 2h→recycling line 3→1st column 2a–8th column 2h. The positions of charging of an eluent, feeding of a stock solution and each discharging are shifted by a unit column in the direction of the solvent flow at a predetermined time interval.

Figure 9:
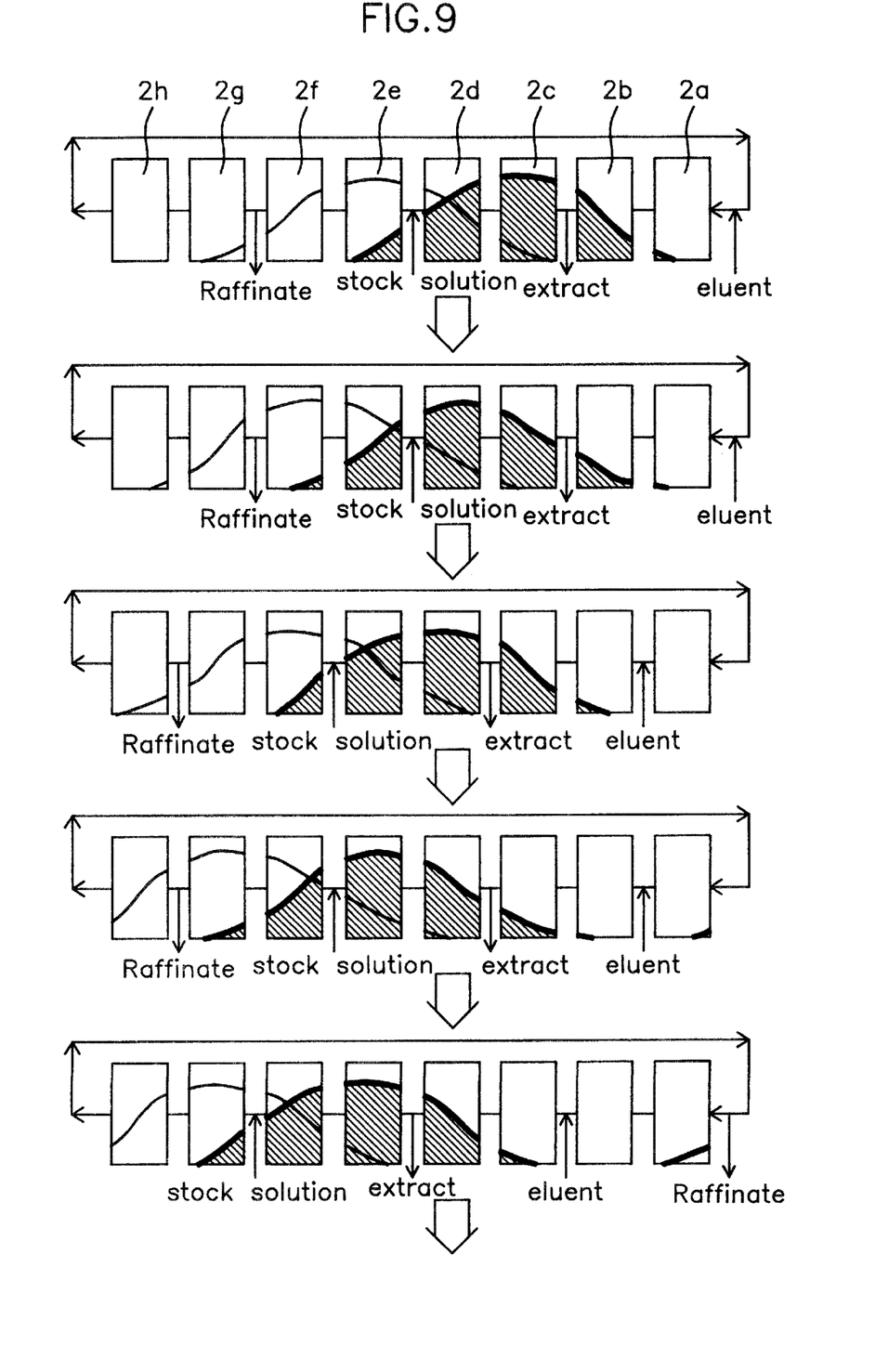
FIG. 9 is a schematic illustration of change in the concentration pattern formed in the 8 columns connected in series in a fluid circulation passage at the times of shifting of the outlets and the inlets.

FIG. 9 schematically shows concentration pattern of an extract component and a reffinate component in the four zones. In FIG. 9, a hatched hill shape represents concentration distribution of an extract and the blank hill shape represents concentration distribution of a raffinate component.

As shown in FIG. 9, in the desorption zone composed of the 1st column 2a and the 2nd column 2b, the concentration of the strongly adsorbable component, i.e., an extract component which is expelled from the filler tends to increase; in the concentration zone composed of the 3rd column 2c and the 4th column 2d, the weakly adsorbable component remaining on the filler is expelled and the strongly adsorbable component is concentrated (in the filler); in the refining zone composed of the 5th column 2e, and the 6th column 2f, the strongly adsorbable component (easily adsorbable component) is adsorbed on the filler and, therefore, the concentration thereof tends to decrease and the weakly adsorbable component (poorly adsorbable component) is recovered as a raffinate together with the eluent; and in the adsorption zone composed of the 7th column 2g, and the 8th column 2h, the raffinate component in the circulation fluid is adsorbed on the filler and, therefore, an eluent containing substantially no raffinate is recovered as a recovery.

As shown in FIG. 9, every time when the inlet is shifted by a switching means, a rotary valve for instance, the peak of the concentration distribution curve shifts in the direction of the liquid circulation. The concentration distribution fluctuates influenced by even a slight change in the operation conditions.

Figure 8:
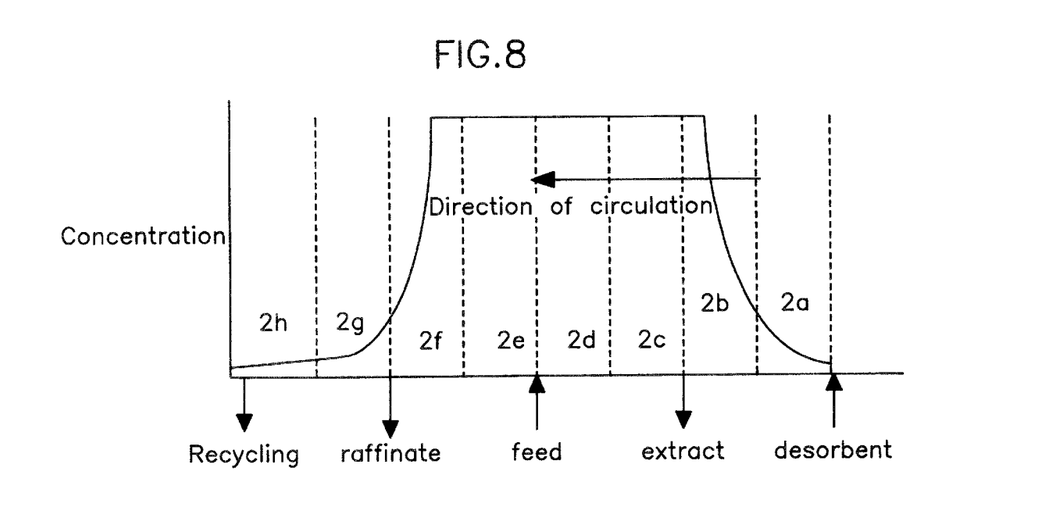
FIG. 8 is an imaginary schematic illustration showing concentration distribution of a solute in each zone formed by columns in the example of the simulated moving bed separation apparatus of this invention.

The solute concentration distribution in the fluid circulating in the columns in the practical operation is as shown in FIG. 8. In FIG. 8, the concentration pattern has flat top in the 3rd column 2c to 5th column 2e. This represents the fact that the concentration is in excess of the maximum measurability of the concentration detector.

The concentration pattern in the four zones as shown in FIG. 9 changes every time when the eluent inlet, the extract outlet, the stock solution inlet and the raffinate outlet are shifted (practically every time a rotary valve is switched). FIG. 9 shows an example of the concentration distribution of the extract and the raffinate in each zone as a representation of this change.

In this invention, specifically speaking, in this example, the concentration of a solute in the liquid circulating in the fluid circulation passage is directly measured in order to monitor such concentration fluctuation in real time and the raffinate and the extract are efficiently withdrawn in response to the concentration fluctuation.

The first UV detector UVD1, which is the detector 6, one of the above-mentioned three concentration detectors, is electrically connected to the operation controller CMP via a communication cable and the detected signal out put from the first UV detector UVD1 is sent to the operation controller CMP.

Figure 10:
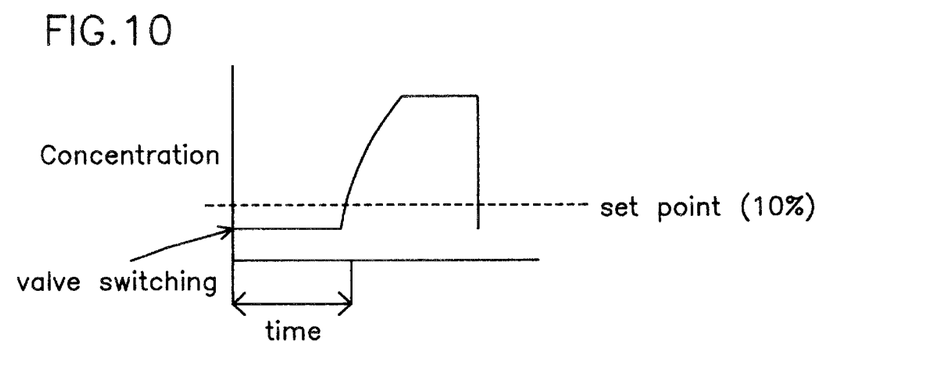
FIG. 10 is an illustration of the time course change in the concentration pattern which starts at the moment of the raffinate outlet shift.

From this first UV detector UVD1, an electrical signal representing the concentration of the weakly adsorbable component is output for instance. This electric signal (electric potential or current) increases during a period from the moment, at which the switching means, a rotary valve for instance, is operated, until the next switching, that is, during a step time, since the concentration of the weakly adsorbable component increases as the time passes. The time course change in the concentration and the corresponding intensity of this electrical signal is shown in FIG. 10.

In this invention, especially in this example, data on the concentration of an object component, a raffinate for example, is collected beforehand using said concentration detectors. This procedure is often called test running. This preliminarily collected data can be obtained by passing a stock solution (feed), whose raffinate concentration is known, for a long period of time (a period in which the concentration pattern reaches a stable hill shape, a time of 50–100 cycles, for instance).

The preliminary collected data is stored in a storing means such as a memory in the operation controller.

Thus the simulated moving bed separation apparatus is practically used for a stock solution containing an object component to be separated.

In the practical operation, the concentration of the desired object component is detected by the concentration detectors installed in the fluid circulation passage. For instance FIG. 11 shows the concentration of the object component in the vicinity of the raffinate outlet for instance in the fluid circulation passage when a port is shifted to a raffinate outlet.

Figure 12:
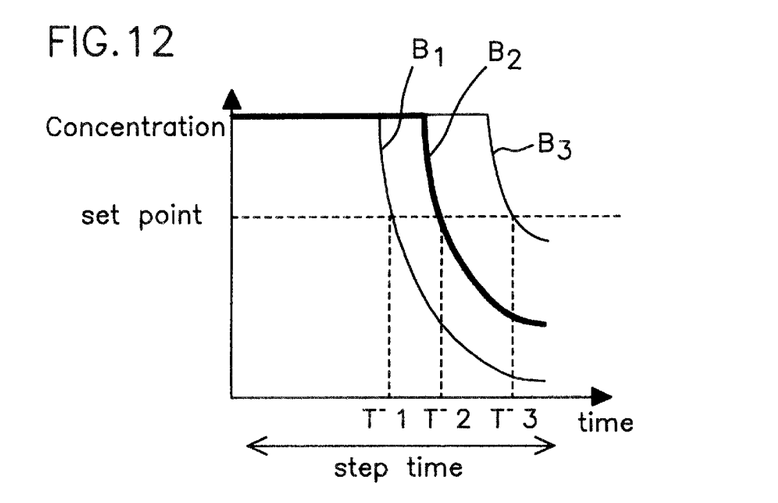
FIG. 12 is an illustration of the various time course changes in the concentration pattern which starts at the moment of the extract outlet shift.

The object component concentration is substantially zero immediately after the shifting and increases as time passes. Also the concentration of an object compound in the vicinity of an extract outlet in the fluid circulation passage can be detected by a concentration detector installed in the fluid circulation passage. For instance FIG. 12 shows the concentration of the object component in the vicinity of the extract outlet for instance in the fluid circulation passage when an outlet is shifted to an extract outlet. The object component concentration is the highest immediately after the shifting and decreases as time passes.

In the practical operation, the electrical signals (corresponding to concentration) output from the concentration detectors are input into the operation controller CMP, which monitors the object component concentration from the time of the start-up point as time passes, measures the time until the concentration of the weakly adsorbable component in the vicinity of the raffinate outlet reaches the predetermining threshold value (10%) for the maximum value as shown in FIG. 10. Also the concentration of the strongly adsorbable component in the vicinity of an extract outlet is the highest at the time of switching of the rotary valve and decreases as time passes. The operation controller CMP measures the lapse of time, the time until the object component concentration in the vicinity of the extract outlet reaches a set point for instance.

Figure 11:
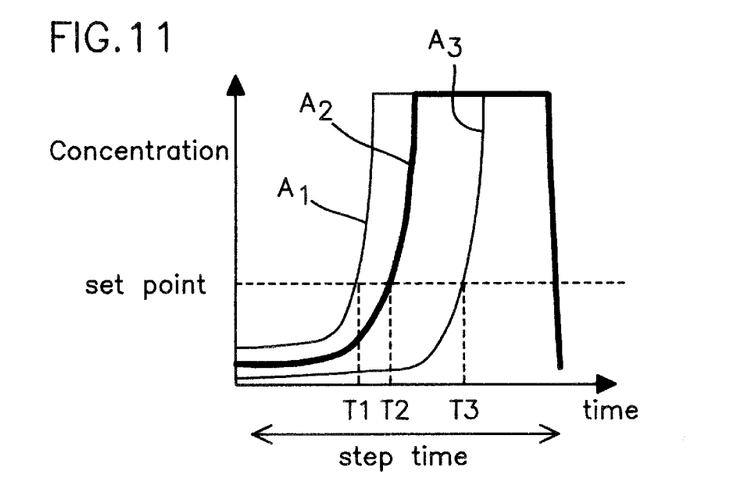
FIG. 11 is an illustration of the various time course changes in the concentration pattern which start at the moment of the raffinate outlet shift.

In FIG. 11, as concentration patterns of the object component in the vicinity of a raffinate outlet detected by the concentration detector and monitored by said operation controller, a pattern A1, which reaches the set point at the time point T1, and a pattern A3, which reaches the set point at the time point T3 are shown. Further a standard concentration pattern of (the object compound in) the raffinate formed in the operation controller CMP by said test running is shown as A2, which reaches the set point at the time point T2. These are imaginary schematic patterns.

Suppose that the concentration pattern of the object component in the vicinity of a raffinate outlet is A1, then the pattern must be corrected to the pattern A2. For this purpose, the operation conditions are modified by (1) decreasing the flow rate of the desorbent pump or (2) decreasing the flow rate of the recycling pump. If the concentration pattern of the object component in the vicinity of the raffinate outlet is A3, it must be corrected to the pattern A2 by (1) by increasing the flow rate of the desorbent pump or (2) increasing the flow rate of the recycling pump.

The situation concerning the concentration of the object component in the vicinity of an extract outlet is the same as above. As concentration patterns detected by the concentration detector and monitored by the operation controller CMP, FIG. 12 shows a pattern B1, which reaches the set point T'1 and a pattern B3, which reaches the set point T'3. Further a standard concentration pattern of (the object compound in) the extract formed in the operation controller CMP by said test running is shown in B2, which reaches the set point at the time point T'2. These are imaginary schematic patterns.

Suppose that the concentration pattern of the object component in the vicinity of an extract outlet is B1, then the pattern must be corrected to the pattern B2. For this purpose, the operation conditions are modified by (1) decreasing the flow rate of the desorbent pump or (2) decreasing the flow rate of the recycling pump. If the concentration pattern of the object component in the vicinity of the raffinate outlet is B3, it must be corrected to the pattern B2 by (1) by increasing the flow rate of the desorbent pump or (2) increasing the flow rate of the recycling pump.

In this example, in addition to the concentration detectors installed in the fluid circulation passage, a first separation column 12, which is a separation means, and a second UV detector UVD2, which is a means for measuring concentration of the component, are connected to the extract-discharging conduit 7 via the sampling means 11 as concentration measuring means as shown in FIG. 3. Also a second separation column, which is a separation means, and a third UV detector, which is a means for measuring concentration of the component, are connected to the raffinate-discharging conduit 18 via the sampling means 20 as concentration-measuring means.

The operation controller CMP receives the electrical signal output from said second UV detector UVD2 and calculates concentration and purity of each component of the extract discharged from the conduit 7. The concentration of each component can be determined by comparison with the reference curve prepared using a standard sample. Purity can be determined from the determined concentration of the desired component and the concentration of the undesired concentration. As to an extract for instance, the concentration and the purity can be calculated from the area covered by the curve as shown in FIG. 5.

The third UV detector in the means for measuring concentration provided at the raffinate-discharging conduit 18 is of the same structure as the second UV detector UVD2.

The third UV detector outputs and electrical signal corresponding to the concentration of each component of a raffinate. This electrical signal (electric potential or current) decreases as time passes during the period from the moment when a port is switched to a raffinate outlet to the next switching, that is, during a step time passes. At the initial stage of a step time, the signal intensity is 0 and it decreases as time passes since the concentration of the component in the raffinate decreases. This can be learned from FIG. 11. The electrical signal detected in the third UV detector is input to the operation controller.

The operation controller monitors concentration which increases or decreases as time passes from the moment when the inlets and the outlets are shifted all at a time based on the electrical signal output from the first UV detector UVD1 to the time of the next shifting, that is, during a step time, in which the concentration is 0 in the initial stage and increases as time passes.

The operation controller calculates the concentration of each component in the fluid circulating in the conduit 3 every time when the inlets and outlets are shifted. Concentration can be obtained by introducing a standard sample whose concentration is known into the UV detector at the same flow rate on the basis of the relation between the concentration and the output of the UV detector which has been established beforehand. When the column in the upstream side of the first UV detector has worked as an adsorption zone column, a refining zone column, a concentration zone column and a desorption zone column in one cycle, the first UV detector UVD1 calculates the concentration distribution of the weakly adsorbable component and the strongly adsorbable component.

The operation controller receives electrical signals output from the second UV detector UVD2 and the third UV detector UVD3 and calculates the average concentration of the components in the extract and the raffinate on the basis of the area covered by the wave curve in the concentration graph.

The concentration can be measured by establishing the relation between the concentration and the output of the UV detector by introducing a sample of a known concentration into the UV detector at the same flow rate. It is desirable to establish the relation between the flow rate of the extract or the raffinate by using a sample of a known concentration. Calculation on concentration and purity can be carried out in accordance with the general method in analysis of chromatograms.

In the simulated moving bed separation apparatus of this example, the operation controller outputs one or more control signals out of the control commands listed in Tables 1 and 2 according to the time until the concentration of the component in the fluid circulation passage measured by the first UV detector UVD1 reaches a predetermined threshold value and the purity of said raffinate and extract.

For instance, an example of measurement results of an extract is shown in FIG. 13 and an example of measurement results of a reffinate is shown in FIG. 14.

Although the invention has been described in detail with respect to an example thereof, the invention is not limited to said example only. Modifications such as below are possible for instance.

(1) In some cases, the number of the columns is a multiple of 4, which is required to form 4 kinds of zones. Usually it is a multiple of 4 in a range of 4–24. In the case when the fluid circulation passage is formed with a plurality of columns which are mutually communicated with conduits, however, the number of the columns forming a zone may be different from zone to zone.

(2) The means switching the inlets and the outlets are not limited to rotary valves and it may be a combination of open/close valves.

(3) The means for measuring concentration of a component may be a combination of different kinds of concentration detectors using no separation means for separating components in an extract or a raffinate or a multiple wave length analysis apparatus which is able to measure the concentration of a plurality of components simultaneously.

(4) For circulating a fluid in the fluid circulation passage forcibly in one direction, a pressure regulation valve which adjusts pressure balance can be used instead of a recycling pump. For instance, the flow rate of the fluid circulating in the fluid circulation passage can be regulated by only adjusting pressure regulation valves installed at the extract outlet and the raffinate outlet, if an eluent is introduced through an eluent inlet into the fluid circulation passage by means of the desorbent pump with a predetermined pressure and a stock solution is introduced through the stock solution inlet into the fluid circulation passage by means of the stock solution pump with a predetermined pressure.

Industrial Applicability

This invention provides a simulated moving bed separation apparatus which accurately monitors the concentration in each zone. This invention provides a simulated moving bed separation apparatus which can be operated by the same simple procedure as the liquid chromatograph. This invention provides a simulated moving bed separation apparatus which can carry out separation of a component without turning our rejects, with little sample loss, high recovery rate, and high productivity. This invention provides a simulated moving bed separation apparatus which can be easily and accurately operated and does not require experience and intuition in operation.

This invention provides a simulated moving bed separation apparatus which continuously monitors the concentration distribution of components in the simulated moving bed composed of the entire columns and automatically control the operation conditions to optimum in accordance with the concentration distribution.

What is claimed is:

1. A simulated moving bed separation process for separating a mixture of substances comprising:

forming a fluid circulation passage comprising a plurality of filler beds each provided with an inlet port and an outlet port and packed with a filler, said filler beds being serially and endlessly connected so as to achieve serial and unidirectional fluid flow through said filler beds, and means for pumping a stock solution including a solute containing said substances through said columns;

introducing said stock solution containing a plurality of substances to be separated into one of the filler beds via the inlet port thereof in order to make an extract rich in adsorbable or strongly adsorbable substances adsorbed on the adsorbent in the said filler bed and several filler beds that follow;

drawing out a raffinate rich in non-adsorbable or poorly adsorbable substances from the filler bed positioned downstream of the filler bed to which said stock solution has been supplied;

introducing an eluent into the filler bed positioned downstream of the filler bed from which said raffinate has been drawn out;

drawing out said extract from the filler bed positioned downstream of the filler bed to which said eluent has been supplied;

passing the remaining solution and said eluent through the fluid circulation passage and recirculating them, wherein the position for introducing said stock solution, the position for drawing out said raffinate, the position for introducing said eluent and the position for drawing out said extract are arranged in the fluid circulation passage in this order along the direction of the fluid flow, and the positions are successively moved in the direction of the fluid flow in the passage intermittently;

setting a threshold concentration value of said solute and a variation range;

detecting a concentration of said solute at least at one point between any two adjacent filler beds;

comparing said concentration with said threshold concentration value to obtain a difference;

controlling a flow rate of at least one selected from the group consisting of said stock solution, raffinate, eluent and extract, a step time, or a temperature of each said filler bed by the difference.

2. A simulated moving bed separation process according to claim 1, further comprising:

setting a threshold concentration value of a component of at least one solution selected from the group consisting of said raffinate and said extract;

setting a threshold purity value of said component;

setting a standard time period from a base concentration of said component at the moment when said position for drawing out said extract or raffinate is shifted to said threshold concentration value;

detecting a concentration of said component to obtain a time period from when said concentration is said base concentration to when said concentration is said threshold concentration value;

detecting a purity of said component when said concentration reaches said threshold concentration value; and if said purity does not reach said threshold purity value, controlling a flow rate of at least one selected from the group consisting of said stock solution, recirculating solution, eluent and extract, a step time, or a temperature of the circulation fluid depending on the difference between said time period and said standard time period.

3. A simulated moving bed separation process according to claim 2 wherein said detection is carried out on both of said raffinate and said extract.

4. A simulated moving bed separation process for separating a mixture of substances comprising:

forming a fluid circulation passage comprising a plurality of filler beds each provided with an inlet port and an outlet port and packed with a filler, said filler beds being serially and endlessly connected so as to achieve serial and unidirectional fluid flow through said filler beds, and means for pumping a stock solution including a solute containing said substances through said columns;

introducing said stock solution containing a plurality of substances to be separated into one of the filler beds via the inlet port thereof in order to make an extract rich in adsorbable or strongly adsorbable substances adsorbed on the adsorbent in the said filler bed and several filler beds that follow;

drawing out a raffinate rich in non-adsorbable or poorly adsorbable substances from the filler bed positioned downstream of the filler bed to which said stock solution has been supplied;

introducing an eluent into the filler bed positioned downstream of the filler bed from which said raffinate has been drawn out;

drawing out said extract from the filler bed positioned downstream of the filler bed to which said eluent has been supplied;

passing the remaining solution and said eluent through the fluid circulation passage and recirculating them, wherein the position for introducing said stock solution, the position for drawing out said raffinate, the position for introducing said eluent and the position of drawing out said extract are arranged in the fluid circulation passage in this order along the direction of the fluid flow, and the positions are successively moved in the direction of the fluid flow in the passage intermittently;

setting a threshold purity value of a component said solute and a variation range;

detecting a purity of said component at least at one point between any two adjacent filler beds;

comparing said purity with said threshold purity value to obtain a difference;

controlling a flow rate of at least one selected from the group consisting of said stock solution, raffinate, eluent and extract, a step time, or a temperature of each said filler bed by the difference.

5. A simulated moving bed separation process according to claim 4, further comprising;

setting a threshold concentration value of a component of at least one solution selected from the group consisting of said raffinate and said extract;

setting a threshold purity value of said component;

setting a standard time period from a base concentration of said component at the moment when said position for drawing out said extract or raffinate is shifted to said threshold concentration value;

detecting a concentration of said component to obtain a time period from when said concentration is said base concentration to when said concentration is said threshold concentration value;

detecting a purity of said component when said concentration reaches said threshold concentration value; and if said purity does not reach said threshold purity value, controlling a flow rate of at least one selected from the group consisting of said stock solution, recirculating solution, eluent and extract, a step time, or a temperature of the circulation fluid depending on the difference between said time period and said standard time period.

6. A simulated moving bed separation process according to claim 5, wherein said detection is carried out on both of said raffinate and said extract.

* * * * *